March 7, 1939.     C. E. FULTON     2,149,595
PROCESS FOR MAKING CLAY POTS
Filed March 12, 1938     2 Sheets-Sheet 1
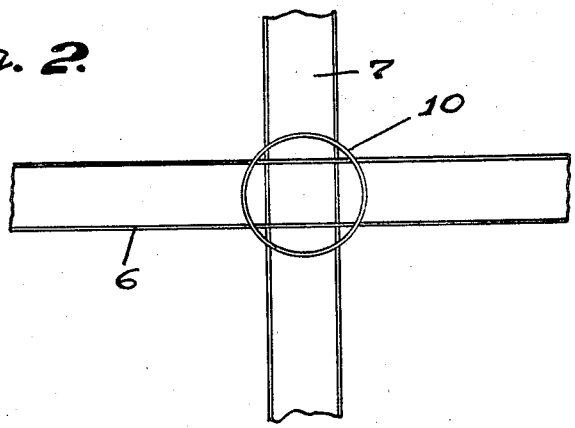
INVENTOR.
CLARENCE E. FULTON
BY Bradley r Bee
ATTORNEYS.

March 7, 1939.  C. E. FULTON  2,149,595
PROCESS FOR MAKING CLAY POTS
Filed March 12, 1938  2 Sheets-Sheet 2
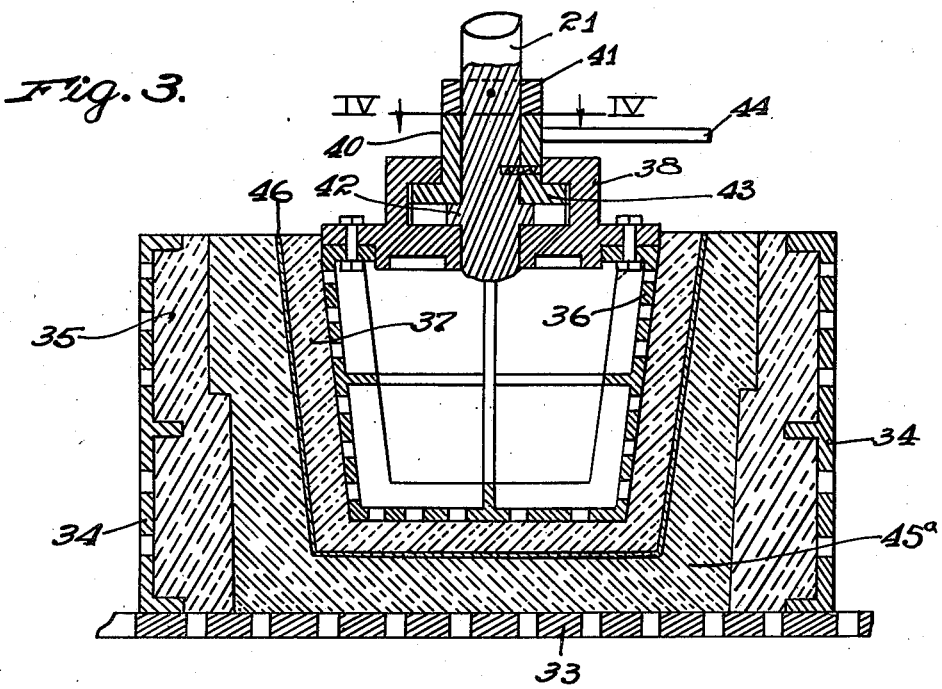
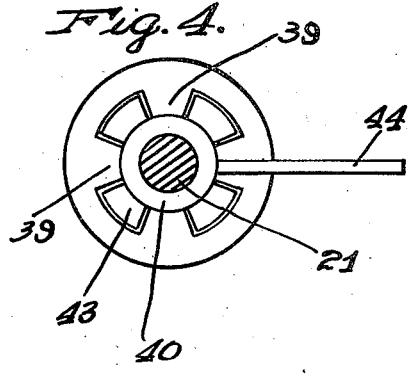
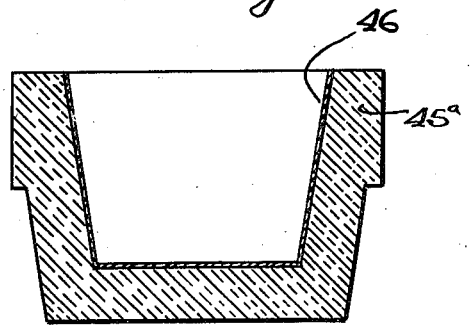
INVENTOR.
CLARENCE E. FULTON
BY Bradley & Bee
ATTORNEYS.

Patented Mar. 7, 1939

2,149,595

UNITED STATES PATENT OFFICE 2,149,595

PROCESS FOR MAKING CLAY POTS

Clarence E. Fulton, Tarentum, Pa., assignor to Pittsburgh Plate Glass Company, Allegheny County, Pa., a corporation of Pennsylvania Application March 12, 1938, Serial No. 195,559

1 Claim. (Cl. 25—156)

The invention relates to the making of clay pots and particularly such pots as are designed for use in the manufacture of glass, such as plate and optical glass. The process is directed to the making of lined pots of the type shown in the patent to Showers No. 1,754,838, dated April 15, 1930. Such pots are formed in two layers preferably of the same composition but the inner one being composed of materials which are more finely ground than those used in the outer layer. The more finely ground material of the inner layer gives greater resistance to the corrosion of the glass than the more coarsely ground material, while the outer layer of more coarsely ground material gives a supporting body which will stand the strains imposed by handling better than the more finely divided material and will not crack in firing, as is apt to occur with a pot composed entirely of the finely divided material.

In the process of the Showers patent, the outer body portion of the pot is formed by a pouring process, a plunger being employed to form the cavity, after which such cavity is supplied with the lining material and a second plunger of smaller diameter is employed to produce the glass receiving cavity in the lining material. In following this process, it has been found impracticable to make the lining less than one inch in thickness, and a lining of as great thickness as this, is of questionable value, since a cracking of this relatively thick lining, such as is liable to occur, is often transmitted to the outer body portion of the pot so that its use must be discontinued.

It is the object of the present invention to provide a process for forming the pot which is not only simpler and cheaper than that disclosed in the Showers patent, and which requires simpler apparatus, but one which will permit the formation of as thin an inner layer as may be desired, often one fourth inch in thickness or even less. A thin layer of this character is ample to resist corrosion throughout the normal life of the pot, and in case a crack occurs in the lining, it will not be transmitted so readily to the body of the pot. A thin inner layer is also much less subject to the development of cracks than a thicker one. Due to the small amount of material required for this thin lining it is practical to use more expensive ingredients in the lining batch composition.

The process will be readily understood by reference to the accompanying drawings showing one form of apparatus which may be used to advantage in practicing the process wherein:

Figure 1 is a partial side elevation and partial section showing the general arrangement of the apparatus. Fig. 2 is a plan view showing the track arrangement. Fig. 3 is an enlarged section through the pot mold and core showing the pressing step. Fig. 4 is a section on the line IV—IV of Fig. 3. And Fig. 5 is a section through the finished pot.

Referring to the general arrangement, as shown in Figs. 1 and 2, 6 and 7 are tracks on which the trucks 8, 9 are mounted for carrying the mixing tank and pot molds, and 10 is a turntable on which the trucks may be switched from one track to another. Mounted above the intersection of the tracks and the turntable, is the mixing and pressing apparatus as shown in Fig. 1. This apparatus is mounted on a framework comprising suitable uprights 11, 11 and transverse tie members 12, 13 and 14. The clay mixer comprises a container 15 with suitable mixing apparatus driven from the motor 16 through the intermediary of the gear 17 and 18, the container being provided at its lower end with a gate 19. The means for handling the core for forming the cavity in the pot comprises cylinder 20 carrying a plunger and the plunger rod 21 to which the core 22 is detachably secured by means later described.

The device for mixing the thin slip which is to form the interior layer of the pot comprises a shaft 22a with mixing paddles 23 on its lower end and having a bevel gear 24 at its upper end carried in the frame 25. Mounted on the frame is a motor 26 for rotating the shaft 22a through the intermediary of the gearing 25a and 26a. The frame 25 is mounted for vertical movement on guideways 27 carried by the framework of the structure, and the up and down movement is secured by means of the shaft 28 which is threaded through a nut 29 swivelled on the frame and rotated from the motor 30 by the gears 31. The thin slip which is to provide the inner layer of the pot is mixed in the tank 32, which is shown in two positions in Fig. 1, the dotted lines at the left of the figure showing the tank during the mixing operation. When the mixture in this tank is to be applied to the core, the frame 25 is lifted to remove the mixing device from the tank and such tank is moved to the right to the full line position for the application to the core of a layer of the mixture.

The pot mold and core are shown on an enlarged scale in Fig. 3 and constitutes the preferred construction of these parts, although this is relatively immaterial in so far as the process is concerned to which the present invention is directed. The pot mold comprises a perforated bottom plate 33 and the side sections 34 preferably of perforated metal and carrying a lining 35 of plaster of Paris or other suitable absorptive material such as a porous clay composition. As is common in the art, the side walls are made in sections, so that after the clay of which the pot is formed has set, the side sections can be removed, leaving the pot seated upon the bottom plate 33 for further drying.

The core, which is to form the cavity of the pot, comprises a shell 36 of perforated metal carrying as its clay engaging and forming member the layer 37 of plaster of Paris or other suitable water absorptive material such as porous clay composition. The shell 36 is bolted to a casting 38 which has a toothed collar 39 (Fig. 4). The plunger rod 21 carries a sleeve 40 swivelled between the collar 41 and the shoulder 42 on the plunger rod and this sleeve has a flange 43 which is toothed. It is also provided with a handle 44 for turning the collar, so that the teeth thereof either lie in registration with the teeth on the flange 39 or out of registration therewith, thus providing means for detaching the plunger rod from the core. Any other suitable means might be employed for providing this detachable connection, which is immaterial, in so far as the present invention is concerned.

In practicing the process with the apparatus as above described, the pot mold is positioned on its truck beneath the mixing container 15, as indicated in Fig. 1 and enough clay batch 45 is supplied to form the body 45a of the pot, that is, the outer layer. This batch is composed of the relatively coarse ground material, heretofore referred to, for giving the pot the necessary amount of strength and resistance to cracking during firing. Various batch mixtures may be used, such as the one set forth in the Showers patent, the mix containing a deflocculating agent and enough water to give a semi-fluid mass which may be readily poured and which is sufficiently responsive to the forming operation, as provided by the core and later described.

Either before or during the supply of batch to the pot mold, the slip which is to form the inner layer of the pot is mixed in the tank 32, shown in dotted lines at the left of Fig. 1. This slip consists preferably of the same ingredients as the pot batch, but with such materials more finely ground, and the amount of water is larger, so that the mixture is a fluid. When this mix has been prepared, the tank is shifted to the full line position beneath the press cylinder, as indicated in Fig. 1, and the plunger is lowered, so that the core occupies the position shown, such lowering of the core causing the level of the slip to rise so that it comes to the top of the core. The core is left in this position until a layer of the desired thickness collects over the surface of the plaster of Paris. As an example, a thickness of one-quarter of an inch is suitable, and the time required in order to secure this thickness of layer is about 10 minutes. Due to the absorptive action of the plaster of Paris this layer is deposited on the core and becomes rigid enough to support its own weight, so that when the core is lifted from the tank, the necessary coating is attached to the core for forming the inner layer of the pot.

The tank 32 is now shifted to the left to the dotted line position, and the pot mold is moved onto the turntable, so that it is in proper alinement with the core carried by the plunger rod 21. The pressing operation is now carried out by slowly forcing the core down into the semi-fluid mass of batch 45 in the pot mold, such downward movement causing the mass to rise and surround the plunger, as indicated in Fig. 3. The core is now detached from the plunger rod 21 by rotating the handle 44 and lifting the plunger rod. On rotating the turntable 90 degrees, the mold with the formed pot therein can be removed on the track 7 and the cycle of forming another pot repeated. The assembly comprising the mold, pot and core which has been removed, is allowed to stand in its removed position until the clay has thoroughly set, preferably about 24 hours, after which the assembly is brought back again to position beneath the cylinder 20, the rod 21 is attached to the core and it is removed from the pot. The mold can then be taken away again and the side sections 34 removed, after which the pot is allowed to dry out on the bottom plate 33 as long as may be necessary before firing it.

The removal of the core from the pot leaves the lining 46 adherent to the body 45a of the pot, since the slip layer will attach itself more positively to the clay than it does to the plaster of Paris of the core. By this method, as thin a lining may be provided as is desired, and as pointed out heretofore, a very thin liner of this type is not subject to cracking, and, at the same time, offers adequate resistance to corrosion throughout the normal life of the pot. The operation can be carried out more cheaply and rapidly than the operation of the Showers patent and is considerably simpler, in that only a single pressing operation is required, whereas in the process heretofore used, two separate pressings were required and two cores of different sizes, one for forming the cavity in the body portion of the pot and the other for forming the cavity in the lining portion thereof. The advantages incident to the improved product and the simplification of the operation will be readily apparent to those skilled in the art. The time saving, due to the use of a single core, instead of the two cores, is also important. It will be understood that the invention is not limited to use with the particular apparatus shown. If desired a straight away arrangement may be used without employing a turntable, in which case, the core would be removed after the clay has set by a lifting device other than the plunger rod 21.

What I claim is:

A process for making a two-layer pot which consists in depositing a sufficient clay batch to form the body portion of a pot in a semi-fluid condition in a pot mold, dipping a core of absorbent material into a slip of clay composition until a layer of such composition is accumulated on the core, and then forcing such core with said layer thereon down into the semi-fluid batch in the pot mold causing such batch in the mold to rise and form the sides of the body portion of the pot, allowing the batch to set with the core in position therein, and finally removing the core and mold.

CLARENCE E. FULTON.